United States Patent [19]

Takeda

[11] Patent Number: 4,591,829
[45] Date of Patent: May 27, 1986

[54] RUN LENGTH CODE DECODER

[75] Inventor: Takashi Takeda, Higashi Murayama, Japan

[73] Assignee: Canon Kabushiki Kaisha, Tokyo, Japan

[21] Appl. No.: 523,977

[22] Filed: Aug. 17, 1983

[30] Foreign Application Priority Data

Aug. 26, 1982 [JP] Japan .................. 57-146955

[51] Int. Cl.[4] .................................. H03K 13/24
[52] U.S. Cl. ............................... 340/347 DD
[58] Field of Search ............... 340/347 DD; 364/900, 364/200; 358/260, 261

[56] References Cited

U.S. PATENT DOCUMENTS

| | | | |
|---|---|---|---|
| 3,925,780 | 12/1975 | Van Voorhis | 358/261 |
| 4,121,259 | 10/1978 | Preuss et al. | 340/347 DD |
| 4,207,599 | 6/1980 | Murayama et al. | 340/347 DD |
| 4,311,989 | 1/1982 | Roux | 340/347 DD |
| 4,475,174 | 10/1984 | Kanayama | 340/347 DD |
| 4,492,983 | 1/1985 | Yoshida et al. | 358/260 |

*Primary Examiner*—William M. Shoop, Jr.
*Assistant Examiner*—Sharon D. Logan
*Attorney, Agent, or Firm*—Fitzpatrick, Cella, Harper & Scinto

[57] ABSTRACT

A run length code decoder, constructed to reduce the number of times of memory access to attain a high speed operation, decodes a run length code such as a modified Huffman code in a facsimile machine. It determines a memory address to be read next from a memory which contains a decode table for the run length code by a result of an arithmetic operation of a predetermined address of the memory, a content at the predetermined address and a next data derived from an input code.

19 Claims, 5 Drawing Figures

FIG. 1(A)

TERMINATING CODES

| RUN LENGTH | WHITE RUN CODE WORD | BLACK RUN CODE WORD | RUN LENGTH | WHITE RUN CODE WORD | BLACK RUN CODE WORD |
|---|---|---|---|---|---|
| 0 | 00110101 | 0000110111 | 14 | 110100 | 00000111 |
| 1 | 000111 | 010 | 15 | 110101 | 000011000 |
| 2 | 0111 | 11 | 16 | 101010 | 0000010111 |
| 3 | 1000 | 10 | 17 | 101011 | 0000011000 |
| 4 | 1011 | 011 | 18 | 0100111 | 0000001000 |
| 5 | 1100 | 0011 | 19 | 0001100 | 00001100111 |
| 6 | 1110 | 0010 | 20 | 0001000 | 00001101000 |
| 7 | 1111 | 00011 | 21 | 0010111 | 00001101100 |
| 8 | 10011 | 000101 | 22 | 0000011 | 00000110111 |
| 9 | 10100 | 000100 | 23 | 0000100 | 00000101000 |
| 10 | 00111 | 0000100 | 24 | 0101000 | 00000010111 |
| 11 | 01000 | 0000101 | 25 | 0101011 | 00000011000 |
| 12 | 001000 | 0000111 | 26 | 0010011 | 000011001010 |
| 13 | 000011 | 00000100 | 27 | 0100100 | 000011001011 |
| 28 | 0011000 | 000011001100 | 46 | 00000101 | 000001010110 |
| 29 | 00000010 | 000011001101 | 47 | 00001010 | 000001010111 |
| 30 | 00000011 | 000001101000 | 48 | 00001011 | 000001100100 |
| 31 | 00011010 | 000001101001 | 49 | 01010010 | 000001100101 |
| 32 | 00011011 | 000001101010 | 50 | 01010011 | 000001010010 |
| 33 | 00010010 | 000001101011 | 51 | 01010100 | 000001010011 |
| 34 | 00010011 | 000011010010 | 52 | 01010101 | 000000100100 |
| 35 | 00010100 | 000011010011 | 53 | 00100100 | 000000110111 |
| 36 | 00010101 | 000011010100 | 54 | 00100101 | 000000111000 |
| 37 | 00010110 | 000011010101 | 55 | 01011000 | 000000100111 |
| 38 | 00010111 | 000011010110 | 56 | 01011001 | 000000101000 |
| 39 | 00101000 | 000011010111 | 57 | 01011010 | 000001011000 |
| 40 | 00101001 | 000001101100 | 58 | 01011011 | 000001011001 |
| 41 | 00101010 | 000001101101 | 59 | 01001010 | 000000101011 |
| 42 | 00101011 | 000011011010 | 60 | 01001011 | 000000101100 |
| 43 | 00101100 | 000011011011 | 61 | 00110010 | 000001011010 |
| 44 | 00101101 | 000001010100 | 62 | 00110011 | 000001100110 |
| 45 | 00000100 | 000001010101 | 63 | 00110100 | 000001100111 |

FIG. 1(B)

MAKE UP CODES

| RUN LENGTH | WHITE RUN CODE WORD | BLACK RUN CODE WORD | RUN LENGTH | WHITE RUN CODE WORD | BLACK RUN CODE WORD |
|---|---|---|---|---|---|
| 64 | 11011 | 0000001111 | 960 | 011010100 | 0000001110011 |
| 128 | 10010 | 000011001000 | 1024 | 011010101 | 0000001110100 |
| 192 | 010111 | 000011001001 | 1088 | 011010110 | 0000001110101 |
| 256 | 0110111 | 000001011011 | 1152 | 011010111 | 0000001110110 |
| 320 | 00110110 | 000000110011 | 1216 | 011011000 | 0000001110111 |
| 384 | 00110111 | 000000110100 | 1280 | 011011001 | 0000001010010 |
| 448 | 01100100 | 000000110101 | 1344 | 011011010 | 0000001010011 |
| 512 | 01100101 | 0000001101100 | 1408 | 011011011 | 0000001010100 |
| 576 | 01101000 | 0000001101101 | 1472 | 010011000 | 0000001010101 |
| 640 | 01100111 | 0000001001010 | 1536 | 010011001 | 0000001011010 |
| 704 | 011001100 | 0000001001011 | 1600 | 010011010 | 0000001011011 |
| 768 | 011001101 | 0000001001100 | 1664 | 011000 | 0000001100100 |
| 832 | 011010010 | 0000001001101 | 1728 | 010011011 | 0000001100101 |
| 896 | 011010011 | 0000001110010 | EOL | 000000000001 | 000000000001 |

INPUT 00001011 (WHITE RUN LENGTH 48)

⟨4⟩
↓
⟨4⟩ + (Z) + 0 = ⟨X+0⟩         (X = 4+Z)
              ↓
       ⟨X+0⟩ + (02) + 1 = ⟨X+3⟩
                        ↓
               ⟨X+3⟩ + (1) + 1 = ⟨X+5⟩
                                  ↓
                                 (B0)

RUN LENGTH CODE DECODER

BACKGROUND OF THE INVENTION

1. Field of the Invention

The present invention relates to a run length code decoder for decoding a run length coded signal used in a facsimile machine.

2. Description of the Prior Art

In the past, a modified Huffman code (hereinafter referred to as an MH code) shown in FIGS. 1(A) and 1(B) has been used as a redundancy suppressing system in a facsimile machine. As shown in FIGS. 1(A) and 1(B), in the MH code, run lengths 0–1728 are divided into groups each comprising 64 run lengths and each run length is represented by a combination of a make-up code which represents a group (and which is a multiple of 64 such as 64, 128, 192, . . . 1728 as shown in FIG. 1(B)) and a terminating code which represents a specific run length in the group (0, 1, 2, 3, . . . 63 as shown in FIG. 1(A)). For example, a white run length "65" is represented by a combination of a code word "11011" which represents 64 and a code word "000111" which represents 1.

In decoding such an MH code, all MH codes are stored in a memory such as a ROM (read-only memory) for a data table in a form of a so-called code tree by using a micro-processor, and the memory is accessed at each node of the tree each time when one bit of a data to be decoded is inputted to sequentially select branches of the tree so that a memory address of a terminal node at which a decoded result is stored is finally reached. In this decoding method, since the memory must be accessed for each input of one bit of the data, processing steps are necessarily large in number and a processing time is long. Thus, in order to attain a practically acceptable processing speed, an expensive fast microprocessor or a fast wired logic circuit is required.

SUMMARY OF THE INVENTION

It is an object of the present invention to provide a high speed run length code decoder having a reduced number of times of memory access.

It is another object of the present invention to provide a high speed run length code decoder suitable for the modified Huffman code used in the facsimile machine.

It is a further object of the present invention to provide a run length code decoder which is simple in construction because of the reduced number of times of memory access and inexpensive in manufacturing cost.

BRIEF DESCRIPTION OF THE DRAWINGS

FIG. 1 shows a code chart of an MH code, in which FIG. 1(A) shows a terminating code chart and FIG. 1(B) shows a make-up code chart.

DETAILED DESCRIPTION OF THE PREFERRED EMBODIMENTS

Figures 2, 3:
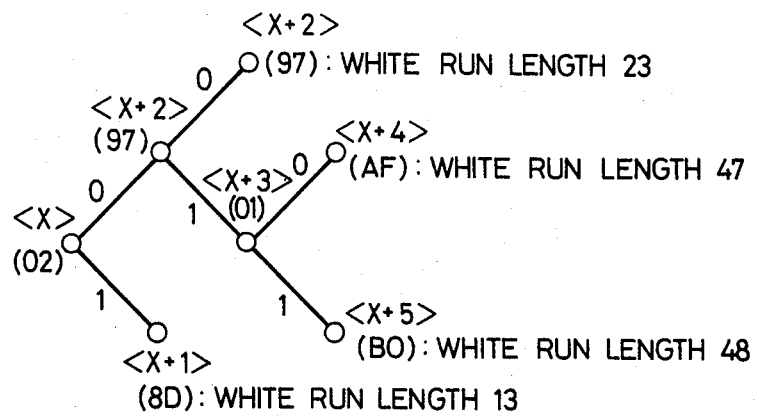
FIG. 2 illustrates a construction of a decode table of the present invention.
FIG. 3 illustrates a decode operation of the present invention.

In many cases, the MH code includes 0's in first several digits. The present invention makes use of this characteristic. Namely, the number of 0's in the first several digits is counted to save the memory access by the number of times corresponding to the count, and a memory content and an input data are summed by adding means to reduce the number of times of access in the course of decoding. Referring to FIGS. 2 and 3, the decode operation is briefly explained.

FIG. 2 shows a portion of a decode table for the MH code by a code tree of the present invention. In FIG. 2, $<x>$ indicates a memory address and numerals in parentheses ( ) indicate memory contents stored at those addresses and they are data for determining hexadecimal two-digit run lengths corresponding to run lengths indicated adjacent to those numerals, or memory addresses to be next read. For example, for a one-byte data (B0), which corresponds to "10110000" in binary notation, a most significant bit (MSB) 1 indicates that the address is at a terminal node or an end of decode point, and the next digit 0 indicates that the data is a terminating code. If the MSB is 0, it indicates that the address is at an intermediate node and there exists an address to be next read, and if the second digit is 1, it indicates that the code is a make-up code. Six digits following to the first two digits represent a run length if it is the terminating code. In the present example, it represents a white run length of "110000" or 48 in decimal notation. For the make-up code, the six digits represent a multiple of 64 because the make-up code consists of the multiple of 64 as described before.

The above table is used for the white run length. A separate table of a similar construction is provided for the black run length.

The decode operation by those tables is now explained with reference to FIG. 3. It is assumed that "00001011" (terminating code) which represents the white run length of 48 is inputted.

The address of the decode table to be first accessed is determined by counting the number of first 0's (leading 0's) in the input MH code. Since "00001011" has four leading 0's, counting means counts them to reach count 4. A content Z (which may be arbitrarily determined) of a memory address (address 4) corresponding to the count 4 is read from the memory, and it is added to the count 4, and the next data 0 is added thereto. (The fifth digit is 1 because the count for the leading 0's is 4.) The resulting sum is set as the memory address $<x+0>$ to be next read.

Then, the content (02) at the memory address $<x+0>$ (which corresponds to $<x>$ in FIG. 2) and the next data 1 are added to the memory address $<x+0>$, and the resulting sum is set as the memory address $<x+3>$ to be next read. Similarly, the content at the memory address $<x+3>$ and the next digit 1 in the input data are added to the memory address $<x+3>$ and the resulting sum is set as the memory address $<x+5>$ to be next read.

The content (B0) at the memory address $<x+5>$ corresponds to "10110000" in binary notation and the MSB thereof is 1. Accordingly, the memory address $<x+5>$ is at the terminal node. Since the second digit is 0 indicating the terminating code, the white run length of 48 which corresponds to "110000" in binary notation is read out by using the following six digits. Thus, the decoding is terminated.

Figure 4:
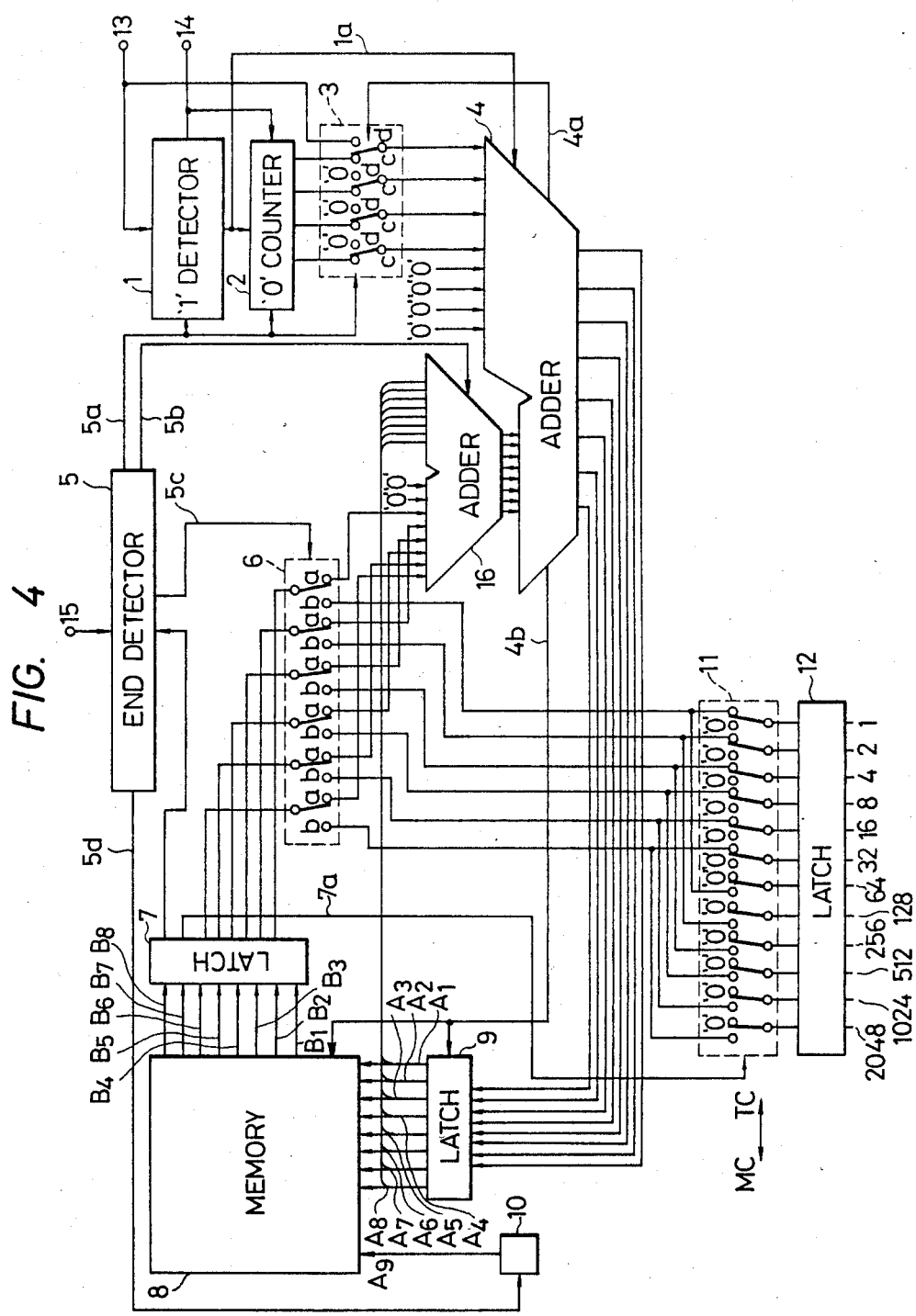
FIG. 4 is a block diagram of a run length code decoder of the present invention.

FIG. 4 shows an embodiment of the decoder which carries out the decoding operations shown in FIGS. 2 and 3. While the circuit of FIG. 4 is a wired logic circuit, it may be constructed by an LSI chip.

In FIG. 4, an input signal applied to an input terminal 13 is supplied to a data "1" detector 1 which is operated in synchronism with a clock signal applied to a terminal 14 to detect a data "1", and an output of the data "1" detector 1 is supplied to a data "0" counter 2. An output of the data "0" counter 2 is supplied to an adder 4 through a data selector 3. An 8-bit output of the adder 4 is supplied to a memory 8 through a latch 9. Output lines A1-A8 of the latch 9 are connected to an adder 16 which is connected to the adder 4. Six low order read lines B1-B6 of the memory 8 are connected to the adder 16 through a latch 7 and a data selector 6, and also connected to a data selector 11. The adder 4 controls the data selector 3 through a signal line 4a, and controls the memory 8 and the latch 9 through a signal line 4b, and an end detector 5 which receives a start signal or an end signal from a terminal 15 controls the data selector 3 through a signal line 5a, controls the adder 16 through a signal line 5b, controls the data selector 6 through a signal line 5c and controls the memory 8 through a signal line 5d and a flip-flop 10 which indicates the white run or the black run. The MSB output line of the latch 7 is connected to the end detector 5 and the next lower order digit line is connected to the data selector 11 for switching the make-up output and the terminate output, through a signal line 7a. The output lines of the data selector 11 are connected to a decode output latch 12.

The operation of the above circuit is now explained.

To start the decode operation, a start of decode signal is supplied from the terminal 15 to the end detector 5. As a result, the end detector 5 resets the flip-flop 10 through the signal line 5d to set a white code flag, switches the data selector 3 to a position c through the signal line 5a and holds the data selector 6 in a position a through the signal line 5c.

If the code "00001011" which indicates the white run length of 48 is applied to the input terminal 13 in synchronism with the clock applied to the clock input terminal 14, the data "0" counter 2 is incremented until the data "1" detector 1 detects the data "1" so that the data "0" counter 2 counts the number of 0's. When the data "1" detector 1 detects the data "1", it controls the counter 4 through the signal line 1a to add the count output $<4>$ of the data "0" counter 2 to the initial value (00) of the adder 16 and set the sum to the latch 9 through the signal line 4b and switch the data selector 3 to a position d through the signal line 4a.

In accordance with the content $<4>$ of the latch 9, the memory 8 outputs the contents (Z) at the memory address $<4>$ to the latch 7. (In this case, the MSB of the content Z must be 0.) The content $<4>$ of the latch 9 is also supplied to the adder 16. Since the data selector 6 is connected to the position a, $<4>$ and (Z) are supplied to the adder 16 and summed therein. As a result, the adder 16 supplies $<Z+4> = <x>$ to the adder 4.

When the next data 0 is inputted from the terminal 13, it is supplied directly to the adder 4 because the data selector is connected to the position d, and it is summed with the output $<x>$ of the adder 16. Thus, the adder 4 produces the output of $<x>+0=0$. The output $<x+0>$ is latched in the latch 9 by the signal line 4b and the memory 8 outputs the content (02) at the address $<x+0>$ to the latch 7. Since the MSB of the content (02) is not 1, the end detector 5 holds the data selector 6 in the position a or a "halfway" position. Thus, the adder 16 sums $<x+0>$ and (02) and supplies the sum to the adder 4.

The adder 4 adds the output $<x+0>+$ (02) of the adder 16 to the next digit "1" of the input data (see the formula at the second line in FIG. 3) and supplies the sum $<x+3>$ to the latch 9. Thus, the content (01) at the address $<x+3>$ of the memory 8 is latched in the latch 7 and it is sent to the adder 16 through the data selector 6 and it is summed with $<x+3>$. The adder 4 adds the last digit "1" of the input data to $<x+3>+(01)$ and the resulting sum $<x+5>$ is sent to the latch 9.

As a result, the content (B0) at the address $<x+5>$ of the memory 8 is supplied to the latch 7. The content (B0) corresponds to "10110000" in binary notation and the MSB thereof is 1. Accordingly, a signal is sent from the MSB (B8) line of the latch 7 to the end detector 5, which detects the end of decode and switches the data selector 6 to the position b or an "end" position through the signal line 5c. Further, the signal "0" is sent from the second digit (B7) line of the latch 7 through the signal line 7a. As a result, the data selector 11 is held to the terminating (TC) position and the low order six digits "110000" of "10110000" are sent to the data selector 11. The data selector 11 selectively outputs the input six-digit data to the high order six digits (make-up) or the low order six digits (terminating) of the 12-digit output. In the present example, "110000" (48 in decimal notation) is supplied to the low order six digits and the data is finally "000000110000".

At the end of the above decode operation, the end detector 5 flips the flip-flop 10 through the signal line 5d to select the black run length decode table, switches the data selector 6 to the intermediate node position through the signal line 5c, resets the adder 16 through the signal line 5b, resets the data "1" detector 1 and the data "0" counter 2 through the signal line 5a, and switches the data selector 3 to the position c to prepare for the next input data.

In accordance with the present embodiment, the memory address to be first accessed can be determined by merely counting the leading 0's in the input MH code without accessing the memory as is done in the prior art method. Thus, the number of times of the memory access is reduced by the number equal to the number of leading 0's.

In the present embodiment, the memory content and the input data are summed to determine the memory address to be next read. However, the arithmetic operation is not limited to the addition and the next memory address may be determined by other arithmetic operation. While the decoder for the modified Huffman code has been described, the present invention is applicable to decode other codes.

As described hereinabove, according to the present invention, means for counting the number of 0's contained in the input code is provided, and the memory address to be first addressed is determined in accordance with the count of the counting means, and the memory address to be next read is determined by the arithmetic operation of the memory address last accessed, the content thereof and the input code. Accordingly, the memory address to be first accessed can be determined by merely counting the number of leading 0's in the input MH code without accessing the memory. Thus, the number of times of memory access is reduced by the number equal to the number of leading 0's, the scale of the decode table stored in the memory is significantly reduced, the decoding speed is increased because of the reduced number of times of memory access, and the simple and inexpensive run length code decoder is attained with relatively low speed elements.

What is claimed is:

1. A binary code decoder comprising:
   memory means for containing a decode table for decoding a binary code consisting of a plurality of binary signals;
   count means for counting one kind of the binary signals;
   determining means for determining an address of said memory means to be first accessed in accordance with a count of said count means and for determining a decode address of the binary code in accordance with data recorded at the first accessed address of said memory means and remaining portions of the binary code not counted by said count means; and
   reading means for reading data recorded at the deocde address determined by said determining means.

2. A binary code decoder according to claim 1 wherein the binary code is a variable-length code.

3. A binary code decoder according to claim 1 wherein said count means counts "0" signals successively from the beginning of the binary code.

4. A binary code decoder accordint to claim 1 wherein data recorded in said memory means is provided with a code indicating whether or not the recorded data is decode data.

5. A binary code decoder according to claim 1 wherein said determining means decides whether data read by said reading means is decode data and, when the data is not decode data, said determining means determines the next address.

6. A binary code decoder according to claim 1 wherein said determining means decides whether data read by said reading means is decode data and, when the data is not decode data, said determining means determines the nest address by adding the data to the remaining portions of the binary code.

7. A binary code decoder according to claim 1 wherein the binary code is a run length code.

8. A run length code decoder comprising:
   memory means containing a decode table for a run length code represented by a code tree;
   count means for counting the number of predetermined bits included in an input code consisting of a combination of "0's" and "1's", wherein said predetermined bits counted by said count means are leading "0's" in said input code;
   means for determining an address of said memory means to be first accessed in accordance with a count of said count means; and
   means for sequentially and selectively accessing addresses of said memory means to produce a decoded signal of said run length code.

9. A run length code decoder comprising:
   detection means for detecting one input code;
   count means for counting the number of other input codes;
   arithmetic operation means for receiving a detection signal from said detection means and a count from said count means and arithmetically operating said count and a predetermined initial value;
   memory means containing a decode table for a run length code represented by a code tree, an address of said memory means to be first accessed being determined by an output of said arithmtic operation means; and
   means for outputting a signal decoded by said memory means.

10. A run length code decoder according to claim 9 wherein said detection means detects an input "1" signal and said count means counts the number of input "0" signals.

11. A run length code decoder comprising:
    memory means containing a decode table for a run length code represented by a code tree, said memory means determining an address in accordance with an input signal;
    arithmetic operation means for arithmetically operating a predetermined address set to said memory means, a content at said predetermined address and the next data derived from the input code to determine an address of said memory means to be next read;
    end detection means for detecting an end of decoding operation based on a signal produced by said memory means; and
    means for outputting a signal decoded by said memory means in response to a detection signal from said end detection means.

12. A run length code detector comprising:
    detection means for detecting one input code;
    count means for counting the number of other input codes;
    memory means containing a decode table for a run length code represented by a code tree, an address of said memory means to be first accessed being determined by a count of said count means;
    first arithmetic operation means for receiving a detection signal from said detection means, outputting the count of said count means to said memory and arithmetically operating a next data derived from the input code and other input signal;
    second arithmetic operation means for supplying a result of an arithmetic operation of a predetermined address from said first arithmetic operation means and a content at the predetermined address of said memory means, or a predetermined initial value to said memory means and supplying said other input signal to said first arithmetic operation means;
    end detection means for detecting an end of decoding operation by a signal outputted from said memory means; and
    means for outputting a signal decoded by said memory means in response to a detection signal from said end detection means.

13. A run length code decoder according to claim 12 wherein said detection means detects an input "1" signal and said count means counts the number of input "0" signals.

14. A run length code decoder according to claim 12 wherein when said first arithmetic operation means receives the count from said count means and the predetermined initial value from said second arithmetic operation means, the address of said memory means to be first accessed is determined by the output of said first arithmetic operation means.

15. A run length code decoder according to claim 12 wherein when said first arithmetic operation means receives the next data derived from the input code and the operation result from said second arithmetic operation means, the address of said memory means to be next read is determined by the output of said first arithmetic operation means.

16. A run length code decoder according to claim 12 wherein said first arithmetic operation means and said second arithmetic operation means are adders for adding input signals thereto.

17. A run length code decoder according to claim 13, wherein when said first arithmetic operation means receives the count from said count means and the predetermined initial value from said second arithmetic operation means, the address of said memory means to be first accessed is determined by the output of said first arithmetic operation means.

18. A run length decoder according to claim: 13, wherein when said first arithmetic operation means receives the next data derived from the input code and the operation result from said second arithmetic operation means, the address of said memory means to be next read is determined by the output of said first arithmetic operation means.

19. A run length code decoder according to claim 13, wherein said first arithmetic operation means and said second arithmetic operation means are adders for adding input signals thereto.

* * * * *